Aug. 27, 1968  E. JOSEPHSON  3,399,397
APPARATUS FOR SENDING AND RECEIVING A SIGNAL ON AN A-C LINE
Filed Jan. 7, 1966  2 Sheets-Sheet 1
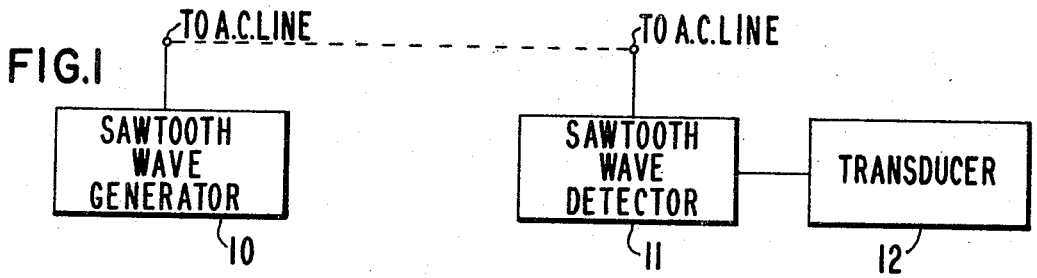
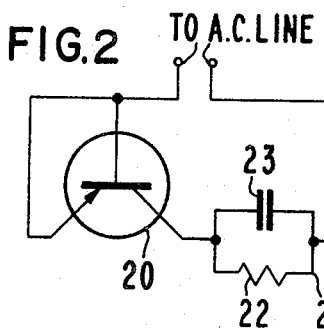
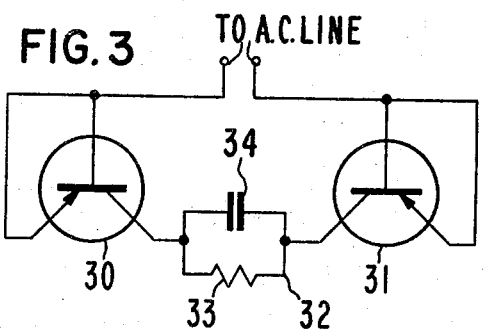
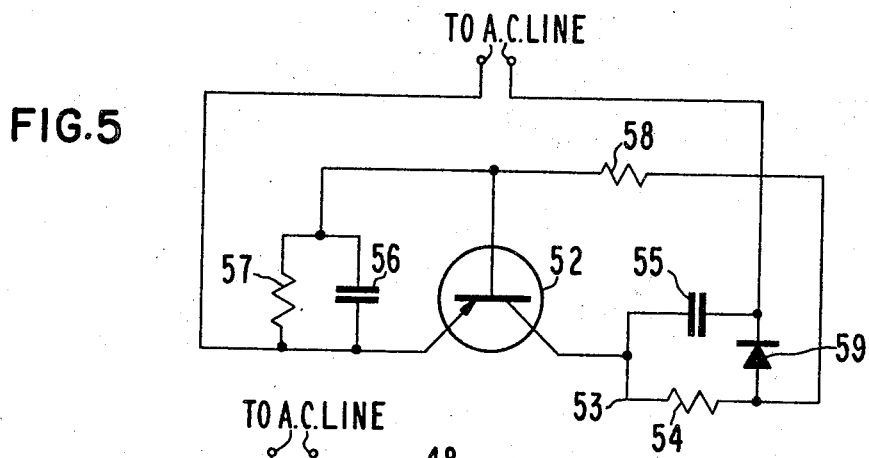
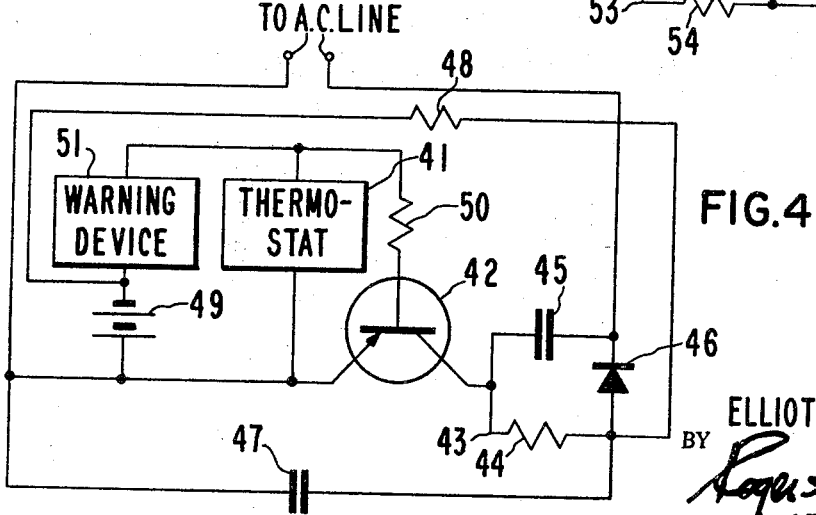
INVENTOR.
ELLIOT JOSEPHSON
BY
ATTORNEY

United States Patent Office 3,399,397
Patented Aug. 27, 1968

3,399,397
APPARATUS FOR SENDING AND RECEIVING A SIGNAL ON AN A-C LINE
Elliot Josephson, 1206 Windimer Drive, Los Altos, Calif. 94022
Filed Jan. 7, 1966, Ser. No. 519,306
9 Claims. (Cl. 340—216)

ABSTRACT OF THE DISCLOSURE

Apparatus for sending and receiving a sawtooth waveform signal through an A-C power line having a sawtoath wave generator connected into the A-C line to modulate the line on at least one-half of its cycle, a detector also connected to the A-C line for detecting the presence of the waveform on the line, and a transducer operative in response to the detector of the waveform.

---

This invention relates to an apparatus for sending and receiving a sawtooth waveform signal through an A-C power line. More particularly, the invention covers a system for sending signals from one point in a building to another point without the need of special interconnections or wiring between the two points.

There are at least three important needs for a simple, inexpensive device for sending a signal along a power line in a building. The first use of such a system is to provide a fire alarm. The transmitter portion of the system may be located in a part of the structure where the fire danger is most prevalent. This location in the building is often a location which is not normally trafficked. On the other hand, the receiver portion of the system is located in a heavily trafficked portion of the structure. The transmitter portion of the system contains the sensing device which detects the temperature changes resulting from the fire, and the receiver portion contains the alarm which warns passers-by of the danger. Obviously there may be a plurality of transmitters and/or a plurality of receivers on the same system. Since the signal is carried on the normal A-C power line, there is no need for wiring interconnections between transmitters and receivers. For example, in a home, the transmitter may be installed near the heating unit, the water heater, in the garage, in a child's bedroom, in out-buildings, and so on. It is only necessary to plug the transmitter into a conventional convenience outlet, or alternatively, to splice it into the A-C line. The receiver, for example, is plugged into an outlet in any central location, such as the kitchen, living room, or master bedroom. Furthermore, the receiver can be moved about during the day, such as from the kitchen in the morning to the master bedroom in the evening. The operation of the system will not be changed by varying the position of the transmitter and the receiver so long as the entire system is supplied from the same transformer secondary which powers the house, as is normally the situation.

A second application for the transmitter and receiver of this invention is to turn on or off a remotely located switch. For example, the receiver of this invention may be permanently located near a pump located underneath a home or out in the yard. The transmitter, on the other hand, may be located in the house in a convenient location. By pushing a button on the transmitter, it is possible to turn on and off the switch located near the receiver. Thus it is never necessary to actually travel to the remote location in order to energize the apparatus located there.

A third application for the transmitter and receiver of this invention is as a counter. In this application, a short signal, for example, of about one-half second duration, is generated by the transmitter each time A-C power is connected to the transmitter. In this application, for example, the transmitter can be located in series with a particular electrical appliance. Each time the appliance (and thus the transmitter as well) is turned on, the transmitter will generate a single pulse. The receiver is used to detect these pulses, and in conjunction with a counter, to count the number of times the particular appliance is turned on.

Briefly, the apparatus for sending and receiving a sawtooth waveform signal through an A-C power line comprises:

A means for generating a sawtooth waveform;

A means for connecting said generating means into an A-C line so that the A-C line signal is modulated on at least one-half of its cycle with said sawtooth waveform;

A means for detecting the presence of a sawtooth waveform on the A-C line;

A means for connecting the detecting means into the A-C line; and

A transducer operative in response to the detection of said sawtooth waveform at said detecting means.

It will be understood that in the above brief description, and hereafter throughout this patent specification, that the term "sawtooth waveform" is used broadly. While the transmitter of this invention indeed does generate a waveform approximating a "sawtooth," once applied to the A-C power line, the previously regular sawtooth shape of the waveform becomes greatly distorted. Accordingly, for the purposes of this invention, a "saw tooth waveform" includes a plurality of spikes. In fact, once modulated into the A-C signal, the previously sawtooth waveform becomes a plurality of "spikes" on the A-C line. Accordingly, the detecting means, or receiver used to detect the "sawtooth waveform" in fact is capable of detecting the presence of these noise spikes. Although electric razors, motors, and vacuum cleaners, etc., will generate noise on the A-C line, such noise is sporadic and of varying intensity. The detecting means, or receiver of this invention is not sensitive to such sporadic noise of varying intensity; it detects and is sensitive only to the type of noise spikes generated by the generating means, or transmitter of this invention.

The invention will be described in more detail below, making reference to the drawings in which:

FIG. 1 represents a block diagram of the apparatus of this invention;

FIG. 2 is a schematic circuit diagram of one embodiment of the transmitter of this invention;

FIG. 3 is a schematic circuit diagram of another embodiment of the transmitter of this invention;

FIG. 4 shows still another embodiment of the transmitter of this invention, including a warning device;

FIG. 5 is a schematic circuit diagram of an embodiment of the transmitter of this invention adapted for counting;

Referring now to FIG. 1, a sawtooth wave generator 10 is connected to an A-C power line as shown. Normally this device is plugged into any available convenience outlet. Sawtooth wave detector 11 is also plugged into a convenience outlet at another portion of the same A-C line. The detector may be plugged in at any point on the same power line transformer secondary into which the generator 10 was connected. Detector 11 is coupled to a transducer 12. Transducer 12 may take the form of a relay, a counter, a warning device, such as a fire alarm, a flashing light, and so on. Various of these applications will be discussed in more detail in connection with certain of the specific embodiments to be described later.

Figure 7:
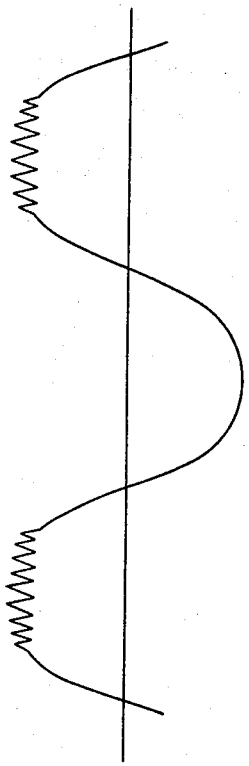
FIG. 7 shows a typical waveform modulated onto an A-C line signal.

Referring now to FIG. 2, one particular embodiment of the sawtooth wave generator, or transmitter of the invention is shown. This embodiment includes transistor 20 and a parallel circuit 21 including resistor 22 and a capacitor 23. The emitter and base of transistor 20 are connected together, as shown, and both connected into one side of the A-C line. The collector of transistor 20 is coupled in series with series circuit 21. The other terminal of series circuit 21 is connected to the A-C line, as shown. In this embodiment of the transmitter, a sawtooth wave will be generated whenever the circuit shown in FIG. 2 is connected to the A-C line. Series circuit 21 is used to determine the time constant for the sawtooth waveform generated. The actual operation of the transmitter is as follows. On the positive half cycle of the 60 cycle A-C line, when the collector of transistor 20 is positive with respect to the emitter, the transmitter of FIG. 2 does not function, but simply conducts current from the collector to the base of transistor 20. This current is limited by the internal collector and base resistances of the transistor as well as resistor 22 in series with the collector of transistor 20. On the other hand, during each negative half cycle of the 60 cycle A-C line, the collector of transistor 20 is driven negative with respect to the emitter until $V_{cer}$ is exceeded and the transistor avalanches through the negative resistance region between $V_{cer}$ and $LV_{ceo}$. The resulting abrupt reduction in voltage across the transistor 20 generates a sharp current spike which is conducted through capacitor 23, which may for example be .01 $\mu f.$; this spike into the A-C power line. The transistor current is now limited by resistor 22, which for example is 10K ohms. This amount of current is insufficient to maintain the transistor in the avalanche region, so the current is then stopped and the voltage once again rises towards $V_{cer}$. The voltage waveform appearing at the A-C line approximates a sawtooth. The A-C power line actually receives a string of current pulses representing the trailing edges of the sawtooth. This string of current pulses is a wideband radio frequency burst at a 60 cycle rate and has a considerable carrying power within the confines of the power transformer secondary powering the A-C line into which the transmitter is attached. As discussed above, this string of current pulses is within the generic term "sawtooth wave" as used in this specification. It is to be understood, with this embodiment of the transmitter shown in FIG. 2, that these spikes will only appear on the positive half cycle of the A-C sinusoidal waveform. The negative half cycle of the A-C sinusoid will be substantually unaffected. Such a typical waveform is shown in FIG. 7.

Referring now to FIG. 3, another embodiment of the transmitter of the invention is shown. In this embodiment, the generating means, or transmitter is connected to the A-C power line by a connecting means in such a way the A-C signal is modulated on both halves of its cycle. Such modulation is accomplished by the use of two transistors 30 and 31. Both of these transistors are connected in the same manner as transistor 20 in FIG. 2; that is, their emitters and bases are connected together and each connected pair is connected to one side of the A-C line as shown. The collectors of each of these transistors are connected to opposite sides of series circuit 32 containing resistor 33 and capacitor 34. One of the two transistors modulates the A-C line during the positive half cycle, and the other transistor serves to modulate the A-C line during the other half cycle. Thus the sawtooth wave is the same as shown in FIG. 7 except that it is modulated during both half cycles, rather than just one of the half cycles, as was the case with the circuit shown in FIG. 2. Parallel R-C circuit 32 provides the predetermined time constant for the sawtooth on both the positive and negative half cycles of the A-C line signal.

Referring now to FIG. 4, a transmitter of another embodiment of the invention is illustrated. In this embodiment, a switching means, or thermostat 41 is coupled across the base-emitter circuit of transistor 42. Transistor 42 is biased in saturation. The thermostat 41 causes the commencement of the generation of the sawtooth waveform signal by causing transistor 42 to oscillate. This means for generating the sawtooth waveform is very similar to the means used in the previous embodiments. The transmitter thus includes a transistor 42 having a means coupled to its collector to provide a predetermined time constant for the sawtooth. In this embodiment, the time constant is provided by parallel R-C circuit 43 including resistor 44 and capacitor 45. As in the previous embodiments, a practical unit is achieved using a 10K resistor for resistor 44 and .01 $\mu f.$ capacitor for capacitor 45. All of the transistors illustrated have been p-n-p transistors; for example, 2N404 type have been satisfactorily employed. However it is apparent to the skilled practitioner that n-p-n transistors may be substituted, making appropriate bias polarity and circuit modifications well known to those skilled in the art.

Diode 46 has two functions: the first function is to provide a constant D-C voltage across capacitor 47, which may, for example, be 10 $\mu f.$; this voltage is for the purpose of operating the oscillator independently of the polarity of the A-C power line. The other function of diode 46 is to allow current to trickle through resistor 48, which may, for example be 10K ohms, into battery 49. Battery 49 may for example be a nickel-cadmium rechargeable battery as is conventionally employed in the appliance industry. This trickling current through diode 46 and resistor 48 maintains a charge on battery 49 during the nonuse. The amount of power utilized to maintain this charge is very small. However, maintaining battery 49 fully charged is important since the device will still function as a warning device in spite of complete cutoff of power from the A-C power line. This feature will be explained in more detail below. Battery 49 also serves as the D-C power supply means coupled across the base-emitter circuit of transistor 42, which is biased to maintain the transistor in saturation. Although this bias current passes through warning device 51, the amount of current is insufficient to actuate the warning device to produce the warning signal.

This circuit is normally plugged into the A-C line. However, no sawtooth waveform will be impressed upon the A-C power line signal until thermostat 41 becomes a closed circuit. With thermostat 41 an open circuit, there is a negative voltage across the base-emitter circuit of p-n-p transistor 42 by virtue of the presence of base resistor 50, which may for example be 1K ohm. Battery 49 and resistor 50 provide this constant negative voltage across the base-emitter circuit, maintaining transistor 42 in the saturated condition. With transistor 42 saturated, no oscillation occurs to produce the sawtooth waveform of the transmitter. However, should a fire cause the temperature to rise sufficiently to close the thermostat 41, thereby placing a short circuit across the emitter-base junction of transistor 42 in series with resistor 50, the transistor 42 will go out of saturation and into its oscillatory mode, thus generating the sawtooth wave-form in the same manner as discussed with the previous embodiments of the invention. This sawtooth waveform will be modulated into the A-C power line signal during one-half of the cycle. Furthermore, the closing of thermostat 41 connects battery 49 directly through warning device 51, which may for example be a horn, a flashing light or the like. Accordingly, warning device 51 will continuously be in the alerting condition until the battery wears out or someone turns the device off. Obviously, with proper battery and a low-power warning device, it could continue for days.

It is appreciated that the device shown in FIG. 4 transmits the sawtooth waveform across the A-C line to a receiver, as with previous embodiments. However, this embodiment is self-contained in that it operates even if a receiver is not employed. When the thermostat 41 is closed, the warning device will operate even if, for some reason, the power to the device across the A-C line is not present. However, if A-C power is in fact still present, the transmitter will transmit the normal sawtooth waveform signal across the A-C line to any receiver connected to the same line. Thermostat 41 is the switching means coupled across the same base-emitter circuit of transistor 42 adapted, when closed, to cause the transistor to oscillate, thereby generating the sawtooth waveform having a predetermined time constant which is determined by the values of resistor 44 and capacitor 45. Warning device 51 is coupled between switching means 41 and D-C power supply means 49 to provide a warning upon the closing of switching means 41. Such closing completes a connection between D-C power supply 49 and warning device 51, thereby energizing the warning device.

One more embodiment of the transmitter of the invention is shown in FIG. 5. In this embodiment, the A-C signal is modulated with a sawtooth waveform for a predetermined period of time, and is then stopped. The means for generating the sawtooth waveform is the same as before, and includes transistor 52 itself along with a means coupled to the collector of transistor 52 providing a predetermined time constant for the sawtooth. This time constant is provided by series circuit 53 including resistor 54, for example 10K ohms, and capacitor 55, for example .01 µf. A means, such as resistor 58 (for example 180K ohms) is used for charging capacitor 56 to a predetermined charged level upon application of an A-C signal to the transmitter. Resistor 58 is connected in series with capacitor 56. Furthermore, a means, such as resistor 57 (for example 1K ohm), is coupled in parallel with capacitor 56 for discharging the capacitor upon removal of the A-C signal from the transmitter. Diode 59, in series with resistor 58, determines the polarity with which capacitor 55 is charged. Diode 59 also allows capacitor 55 to be charged only during one-half cycle of the A-C signal from the A-C line. Note that the series circuit including resistor 58 and diode 59 are connected to one terminal of capacitor 56.

When the circuit shown in FIG. 5 is not connected to the A-C line, capacitor 56 is initially discharged. As soon as power is applied by connecting the circuit to the A-C line, the base of transistor 52 is lifted to the same potential as its emitter, just as in the transmitter of the previous embodiments, in particular FIG. 1. Again oscillation occurs and the signal is generated. During the generation of the sawtooth waveform signal, the capacitor begins to charge through diode 59 and resistor 58, as discussed above. Using a 180 K ohm resistor for resistor 58, and a 260 µf. capacitor for capacitor 56, the capacitor will become fully charged in about one-half second. It is thus charged to the base-emitter threshold voltage of transistor 52, turning off the transistor into saturation and thus stopping the oscillation. Accordingly, the sawtooth waveform will no longer be generated to the A-C line.

The signal of the transmitter will remain silent until after the removal of the power and continue silent until power is again applied and the same sequence is repeated. Upon removal of the power, capacitor 56 discharges through resistor 57 to the discharged condition the capacitor was in prior to application of power. Thus, the transmitter circuit of FIG. 5 is again ready for reapplication of power. If a counter is included in the receiver of the invention, to be discussed below, such a counter will count the number of times power has been applied and turned off since the transmitter circuit of FIG. 5 will generate one series of sawtooth waveforms for each time power is applied.

Figure 6:
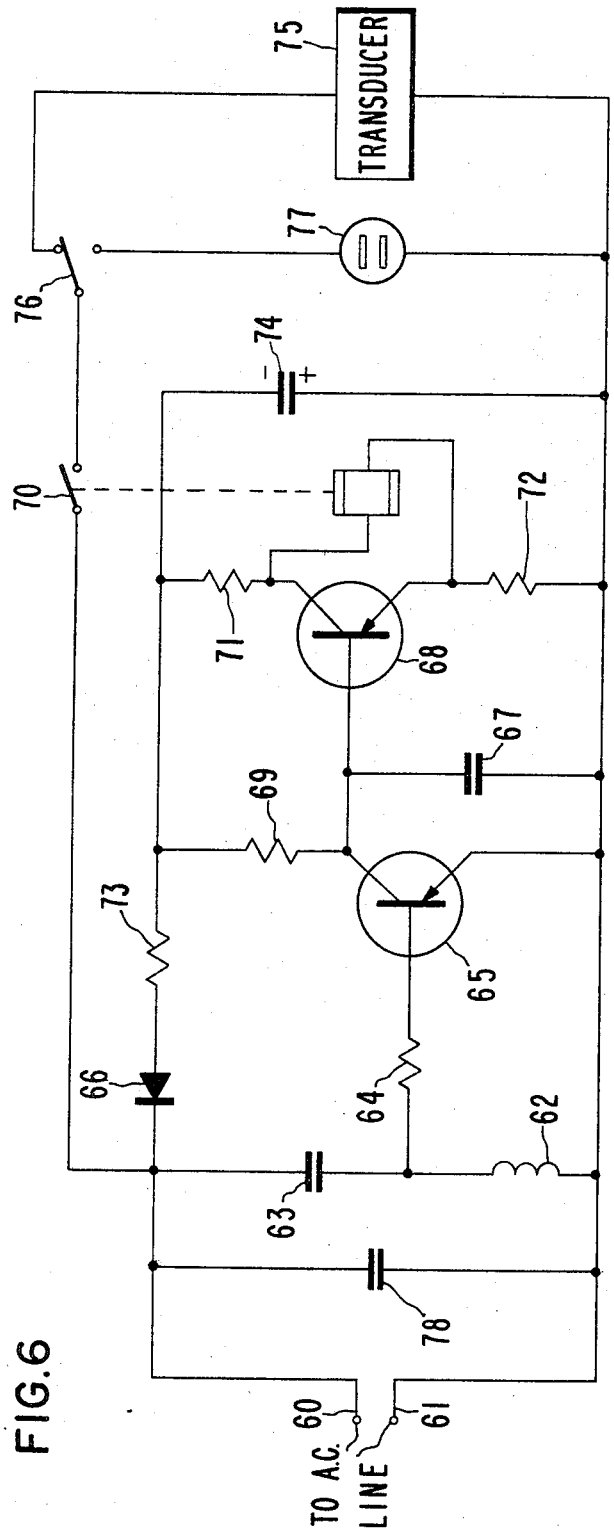
FIG. 6 is a schematic circuit diagram of a preferred embodiment of a receiver of this invention.

One embodiment of the receiver of this invention is shown in FIG. 6. This receiver detects the presence of a sawtooth waveform on an A-C line signal such as that shown in FIG. 7. The A-C line signal is applied to the receiver of FIG. 6 through terminals 60 and 61. Inductor 62, for example, 100 µh. and capacitor 63, for example .01 µf., together form a filtering means, or high-pass filter, through which the 60 cycle signal is passed to ground. However the sawtooth waveform itself is passed through capacitor 63 and resistor 64, for example 57 ohms, to a first switching means. The input of this switching means, or p-n-p transistor 65, is connected to receive the sawtooth wave signal, and is adapted to remain in one condition in the absence of the sawtooth wave signal at its input, or base, and in the opposite condition in the presence of the spikes of the sawtooth wave signal at its input, or base. Resistor 64 protects transistor 65 against a possible high vovltage spike at the time the receiver is turned on.

Diode 66 rectifies the A-C line signal to produce the D-C power required for the operation of the receiver.

An integrating means, or capacitor 67, which may, for example, be .01µf, is connected to the output of transistor 65 and is adapted to maintain a predetermined voltage level during the presence of the sawtooth wave signal both during the presence of the spikes and during the normal interval between spikes. Thus capacitor 67 thus integrates the sawtooth waveform to achieve a relatively constant predetermined voltage level at the collector of transistor 65. In the absence of the sawtooth waveform signal at its input, transistor 65 is normally off.

A second switching means, or transistor 68, has its input, or base, coupled to the output, or collector, of transistor 65 and to the integrating means, or capacitor 67. This second switching means, or transistor 68, is adapted to remain in one condition during the presence of the predetermined voltage level on capacitor 67, and in the other condition during the absence of that predetermined voltage level. In this embodiment, transistor 68 is normally "on" or saturated in the absence of the predetermined voltage level on capacitor 67 as a result of the current through resistor 69, which may, for example, be 82K ohms, into the base of transistor 68.

In the embodiment shown, transistor 68 has its emitter-collector circuit parallel coupled across a relay 70, as shown. In the absence of a sawtooth waveform signal at the base of transistor 65, and the concomitant absence of the predetermined voltage at the collector of transistor 65, transistor 68 is on (in the saturated condition). In that condition, current passes directly through the collector-emitter circuit of transistor 68 to short out relay 70. This relay may, for example, employ a 2000 ohm coil with a 4 ma. pull-in rating. However, when the predetermined voltage level appears on capacitor 67 as a result of the sawtooth waveform at the input circuit, transistor 68 turns off and resistors 71 and 72 provide the proper voltage drop across relay 70. Resistor 71 may, for example, be 1.5K ohms and resistor 72, 100 ohms. These resistors further prevent the appearance of a short circuit through transistor 68 while transistor 68 is conducting from collector to emitter. The resultant circuit loads might otherwise damage the transistor. Resistor 73, for example 5.6K ohms, serves as a dropping resistor to lower the voltage across the circuit including transistor 68. Capacitor 74, which, for example is 10 µf, connected in the polarity shown, is a ripple filter across the power line.

It is interesting to observe that in the absence of the sawtooth waveform signal at the input of transistor 65, that transistor 68 is conducting or saturated. Capacitor 67, together with resistor 69 then form an R-C filter. Each spike appearing at the base of transistor 65 tends to drive transistor 65 into saturation, thus shorting or discharging capacitor 67. However, before this capacitor has a chance to discharge to the point where transistor 68 would again turn on, the next pulse arrives. The R-C time constant of resistor 69 and capacitor 67 are chosen to accomplish this timing. Accordingly, transistor 68 will not turn on again until the signal at the input of transistor 65 is no longer being received.

The receiver circuit of FIG. 6 may be employed to operate any type of electrical apparatus. For example, transducer 75 may be a warning bell denoting the presence of fire. Alternatively, it may be a flashing light, or the like. Note that power will not be applied to transducer 75 until the sawtooth waveform is received on the circuit, thus closing relay 70 as discussed above. In the embodiment illustrated, switch 76 can be used to switch the output of the circuit from transducer 75 to outlet 77. When connected to outlet 77, the receiver circuit is used, upon receipt of an input signal, to energize whatever is plugged into the outlet. The circuit may thus be used to turn or remotely located electrical apparatus, as discussed earlier.

In another embodiment, transducer 75 may be a counter. In that embodiment, the counter will count the number of times the A-C power line is applied across the transmitter illustrated in FIG. 5, as discussed earlier in connection with the transmitter shown in FIG. 5.

Capacitor 78, for example, .01 µf, across the A-C line is employed to block unwanted noise present at the input terminals 60 and 61.

One successful modification of the receiver circuit of FIG. 6 uses, as the second switching means, a relay alone without a transistor (thus eliminating transistor 68). In such an embodiment, transistor 68, along with resistors 69, 71, and 72 are eliminated. Relay 70 is placed in series with the collector of transistor 65, substituting for resistor 69. Such a modified circuit has less sensitivity to input signal, but is still completely operatively. The reduction in sensitivity results from the effective removal of one stage of amplification (comprising transistor 68). In this embodiment, the second switching means includes a relay in series with the collector circuit of the transistor (65) of the first switching means.

It will be appreciated by those skilled in the art that the embodiments illustrated are preferred embodiments on the invention, and are not intended as limitations upon its scope. Many modifications, improvements, and alterations may be made in the embodiments described without departing from the intended scope of the invention, as set forth in the claims which follow.

What is claimed is:

1. Apparatus for sending and receiving a sawtooth waveform signal through an A-C power line which comprises:
    a means for generating a sawtooth waveform, said generating means including a pair of transistors having a means coupled to both collectors which provides a predetermined time constant for the sawtooth;
    a means for connecting said generating means into an A-C line so that the A-C line signal is modulated on both halves of its cycle with said sawtooth waveform;
    a means for detecting the presence of a sawtooth waveform on said A-C line;
    a means for connecting said detecting means into said A-C line; and
    a transducer operative in response to the detection of said sawtooth waveform at said detecting means.

2. The apparatus for sending and receiving a sawtooth waveform signal through an A-C power line of claim 1 further characterized by said means for providing a predetermined time constant being a parallel R-C circuit.

3. A transmitter for sending a sawtooth waveform signal through an A-C power line which comprises:
    a means for generating a sawtooth waveform, said means including a transistor having a means coupled to its collector which provides a predetermined time constant for the sawtooth;
    a D-C power supply means coupled across the base-emitter circuit of said transistor biased to maintain said transistor in saturation;
    a switching means coupled across said base-emitter circuit of said transistor adapted, when closed, to cause said transistor to oscillate, thereby generating said sawtooth waveform of said predetermined time constant.

4. The transmitter of claim 3 further characterized by the addition of a warning device coupled between said switching means and said D-C power supply means which provides a warning upon the closing of said switching means, said closing completing a connection between said D-C power supply means and said warning device, thereby energizing said warning device.

5. The transmitter of claim 3 further characterized by the addition of a means for coupling said transmitter to an A-C power line, and a means for coupling said power line to said D-C power supply, whereby current is trickled from said A-C power line to said D-C power supply, maintaining a predetermined charge upon said D-C power supply.

6. The transmitter of claim 5 further characterized by said coupling means between said power line and said D-C power supply being a diode in series with a resistor.

7. A transmitter for modulating an A-C signal with a sawtooth waveform for a predetermined period of time and then stopping said modulation, which comprises:
    a means for generating a sawtooth waveform, said means including a transistor having a means coupled to its collector which provides a predetermined time constant for the sawtooth;
    a charge storage means coupled across the base-emitter circuit of said transistor;
    a means coupled to said charge storage means for charging said charge storage means to a predetermined charge level upon application of an A-C signal to said transmitter, said means for charging said charge storage means being a series circuit including a diode and a resistor, said series circuit being coupled in series with said charge storage means, whereby said sawtooth waveform is generated during said charging; and
    a means coupled to said charge storage means for discharging said charge storage means upon removal of said A-C signal from said transmitter, whereby said sawtooth waveform is generated only once for each application of said A-C signal to said transmitter.

8. The transmitter of claim 7 further characterized by said charge storage means being a capacitor coupled between the base and emitter of said transistor.

9. The transmitter of claim 7 further characterized by said means for discharging said charge storage means being a resistor in parallel with said charge storage means.

References Cited

UNITED STATES PATENTS

| | | | |
|---|---|---|---|
| 2,777,057 | 1/1957 | Pankove | 325—318 |
| 3,003,121 | 10/1961 | Hileman | 307—228 X |
| 3,011,102 | 11/1961 | Balan | 340—310 X |
| 3,049,677 | 8/1962 | Wolfendale | 307—228 X |
| 3,105,160 | 9/1963 | Adler | 307—228 |
| 3,114,882 | 12/1963 | Hofstein | 325—318 X |
| 3,284,791 | 11/1966 | Voigt et al. | 340—310 |

EUGENE G. BOTZ, *Primary Examiner.*